Nov. 6, 1962     T. M. WOODWARD     3,062,358
CONVEYOR FOR PARKING CARS AND THE LIKE
Filed June 6, 1960     4 Sheets-Sheet 1

INVENTOR
THEODORE M. WOODWARD

BY

HIS ATTORNEY

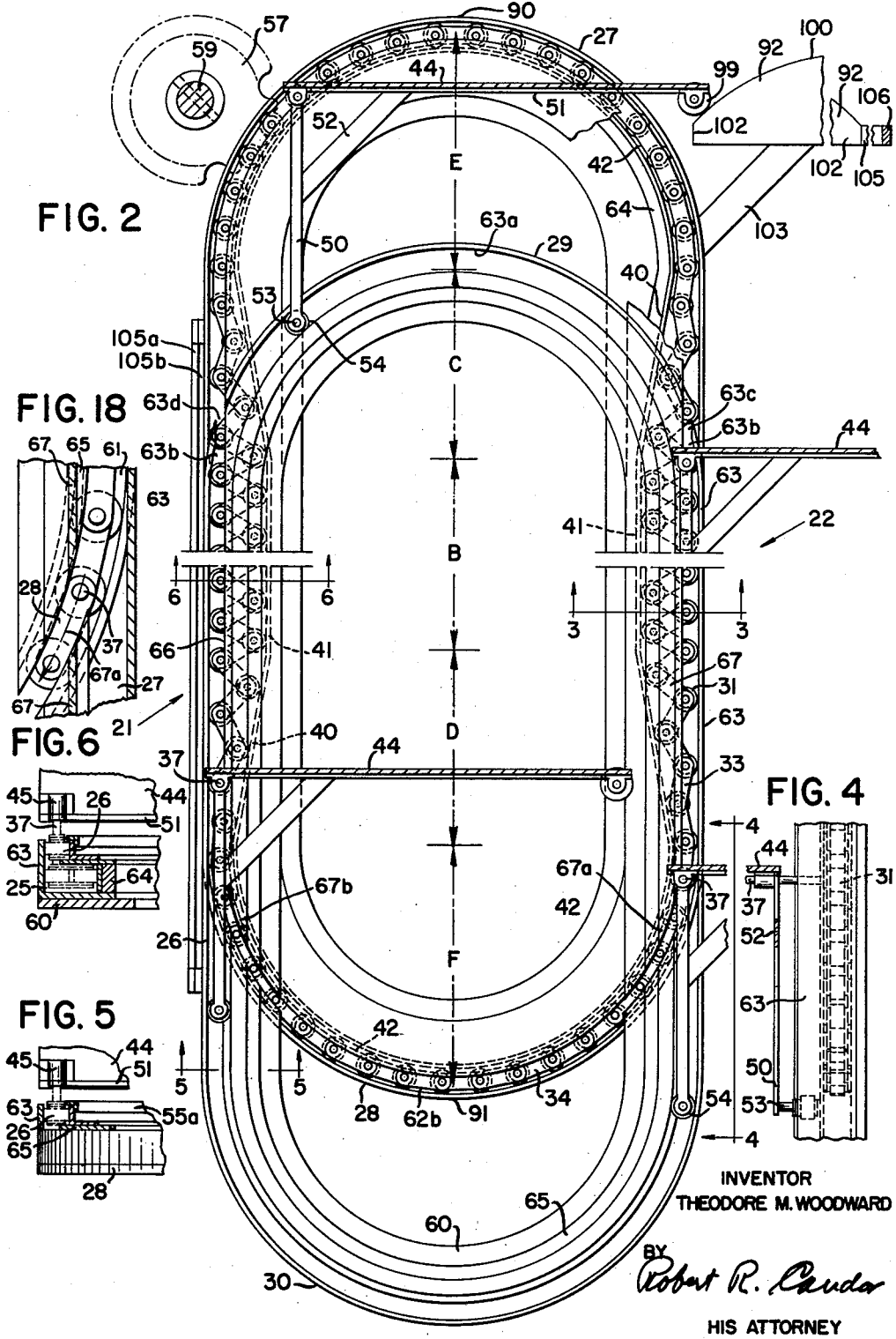

Nov. 6, 1962 T. M. WOODWARD 3,062,358
CONVEYOR FOR PARKING CARS AND THE LIKE
Filed June 6, 1960 4 Sheets-Sheet 3
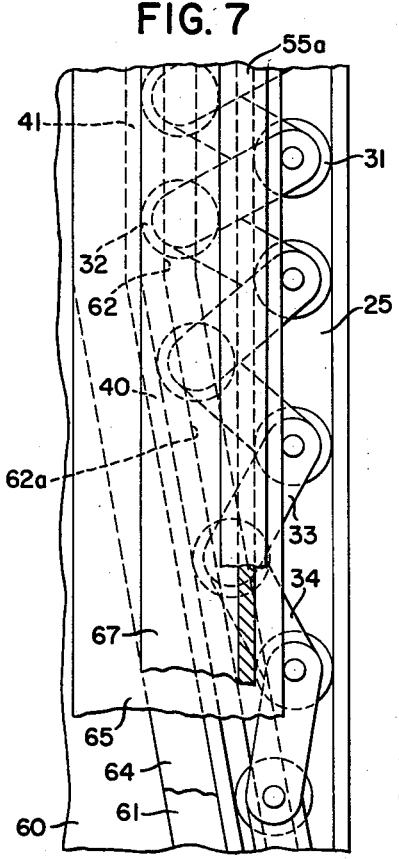
FIG. 7
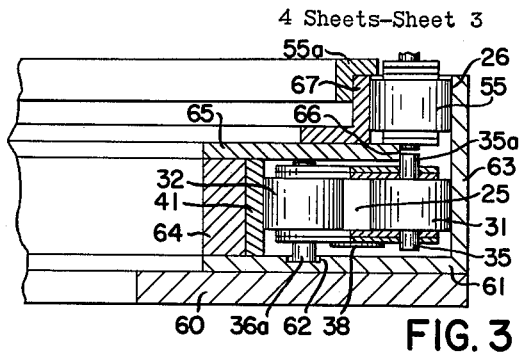
FIG. 3
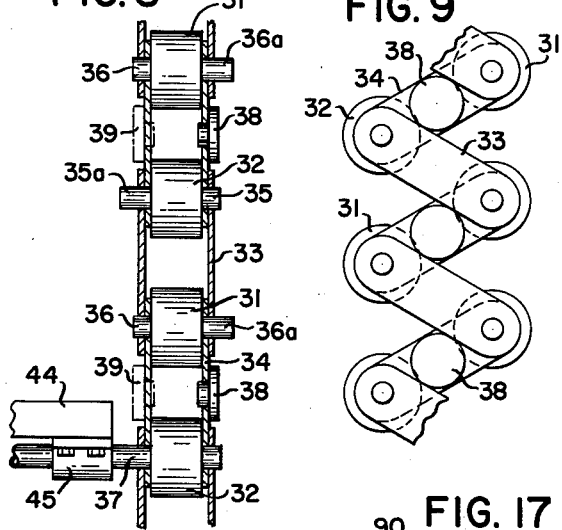
FIG. 8
FIG. 9
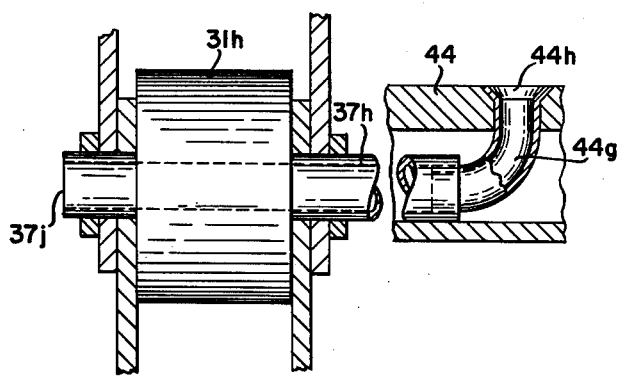
FIG. 15
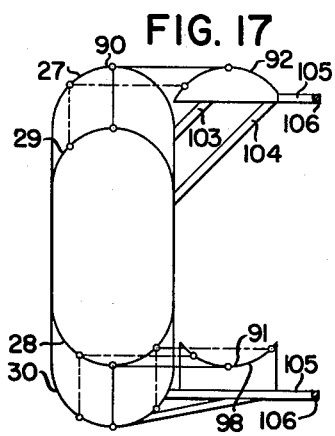
FIG. 17
INVENTOR
THEODORE M. WOODWARD
BY *Robert R. Candor*
HIS ATTORNEY Nov. 6, 1962 T. M. WOODWARD 3,062,358
CONVEYOR FOR PARKING CARS AND THE LIKE
Filed June 6, 1960 4 Sheets-Sheet 4
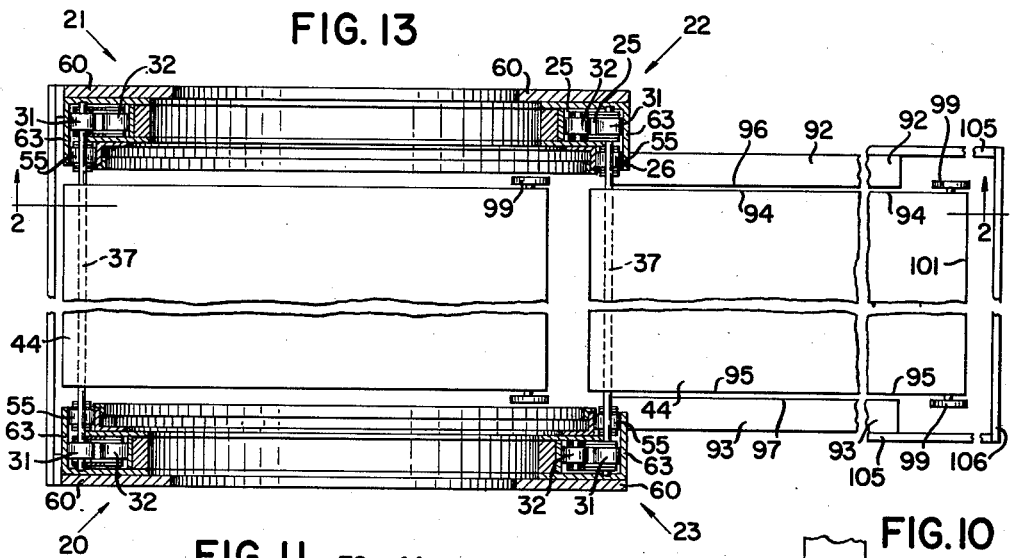
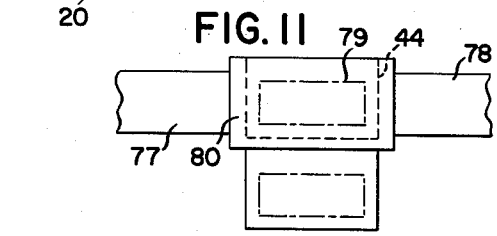
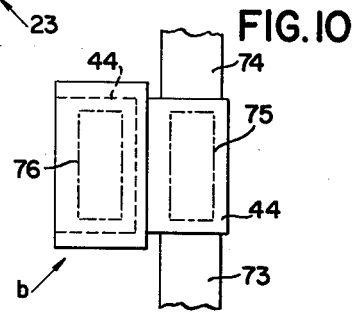
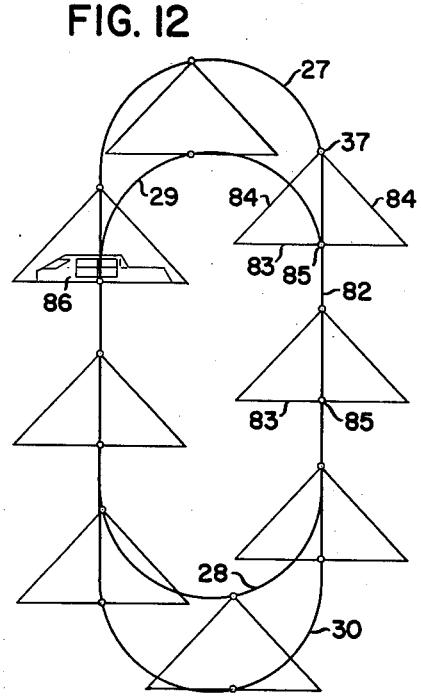
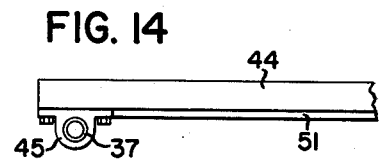
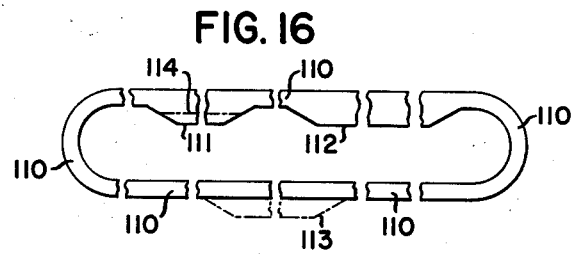
INVENTOR
THEODORE M. WOODWARD
BY Robert R. Pandro
HIS ATTORNEY United States Patent Office 3,062,358
Patented Nov. 6, 1962

3,062,358
CONVEYOR FOR PARKING CARS
AND THE LIKE
Theodore M. Woodward, 101 Yale Ave., Dayton 6, Ohio
Filed June 6, 1960, Ser. No. 34,304
12 Claims. (Cl. 198—154)

This invention relates to a conveyor for parking cars and the like on a plurality of substantially horizontal platforms or shelves on said conveyor which travel along two upward and downward paths joined by two bridging paths at the tops and bottoms of said upward and downward paths.

The platforms are caused to travel at relatively slow speeds along the upward and downward paths and at relatively high speeds along the bridging paths. By this construction it is possible to place the platforms on the conveyor so that the platforms are relatively close together as they travel on the upward and downward paths, and so they travel at a relatively high speed along the bridging paths. In this manner, each platform can travel out of the way of the next upwardly or downwardly moving platform to prevent damage to the tops of the cars which are placed on the platforms.

This invention also relates to a closed orbital conveyor member in which certain portions of said conveyor travel simultaneously at different speeds.

When the conveyor is used for parking cars, the conveyor structure may be placed partly underground, partly above ground in varying degrees of depth, or at any other relationship with the ground level. The platforms may be stopped at the particular loading level selected, and the cars may be driven onto the platforms, and then may be moved up or down, so that the next platform may be placed at the loading level to receive the next car or cars.

According to this invention the parking capacity of any particular parking area may be increased several fold at a relatively low cost, since the conveyor structure may be manufactured with a relatively small number of parts, at a relatively low cost, and occupies a relatively small ground area.

Another feature of this invention is that a link belt chain may be formed into an orbital construction, and such link chain can be caused to travel simultaneously at a speed along one portion of the orbit which is different from the speed of another portion of the orbit.

Another feature of this invention is that a link chain may be caused to travel along in zigzag manner during a portion of its travel, so that the joints or joining pins of the links travel at a relatively slow speed during said portion of the orbital travel of the chain, while another portion of the belt travels along at a higher speed by causing the links of said belt to travel in single file relationship along said other portion.

Accordingly, it is an object of this invention to provide a conveyor, belt or chain, having one or more of the features of the invention above disclosed.

Other objects of this invention become apparent from this description of this invention and/or from the accompanying drawings in which:

FIGURE 2 is a diagrammatic side view of one of the sides of the conveying structure shown in FIGURE 1, taken along the line 2—2 of FIGURE 13.

FIGURE 3 is an enlarged diagrammatic cross-section taken along the line 3—3 of FIGURE 2.

FIGURE 4 is a diagrammatic elevation view from the line 4—4 of FIGURE 2.

FIGURE 5 is a diagrammatic cross-section along the line 5—5 of FIGURE 2.

FIGURE 6 is a diagrammatic cross-section along the line 6—6 of FIGURE 2.

FIGURE 7 is an enlarged diagrammatic view of a portion of FIGURE 2.

FIGURE 8 is a diagrammatic cross-section of the conveying chain parallel to and along the upper part of FIGURE 4.

FIGURE 9 is a diagrammatic elevation of the edge of the conveying chain in zigzag condition.

FIGURE 10 is a diagrammatic top view of an installation of a conveyor of this invention.

FIGURE 11 is a diagrammatic top view of another installation of a conveyor according to this invention.

FIGURE 12 is a diagrammatic elevation of another embodiment of this invention using pendant platforms.

FIGURE 13 is a diagrammatic horizontal cross-section taken generally along line 13—13 of FIGURE 1 of the entire conveyor showing diagrammatically the relationship of the two conveyor chains, platforms, etc.

FIGURE 14 shows diagrammatically a support attachment for the shelf or platform construction.

FIGURE 15 is a vertical cross-section showing a drain connection for the shelves.

FIGURE 16 is a diagrammatic view showing a conveyor used in horizontal position.

FIGURE 17 is a diagrammatic representation of the auxiliary supporting arches for the ends of the platforms.

FIGURE 18 is an enlarged diagrammatic cross-section showing a slot construction for the passage of the shelf pins near the lower right hand corner of FIGURE 2.

Figure 1:
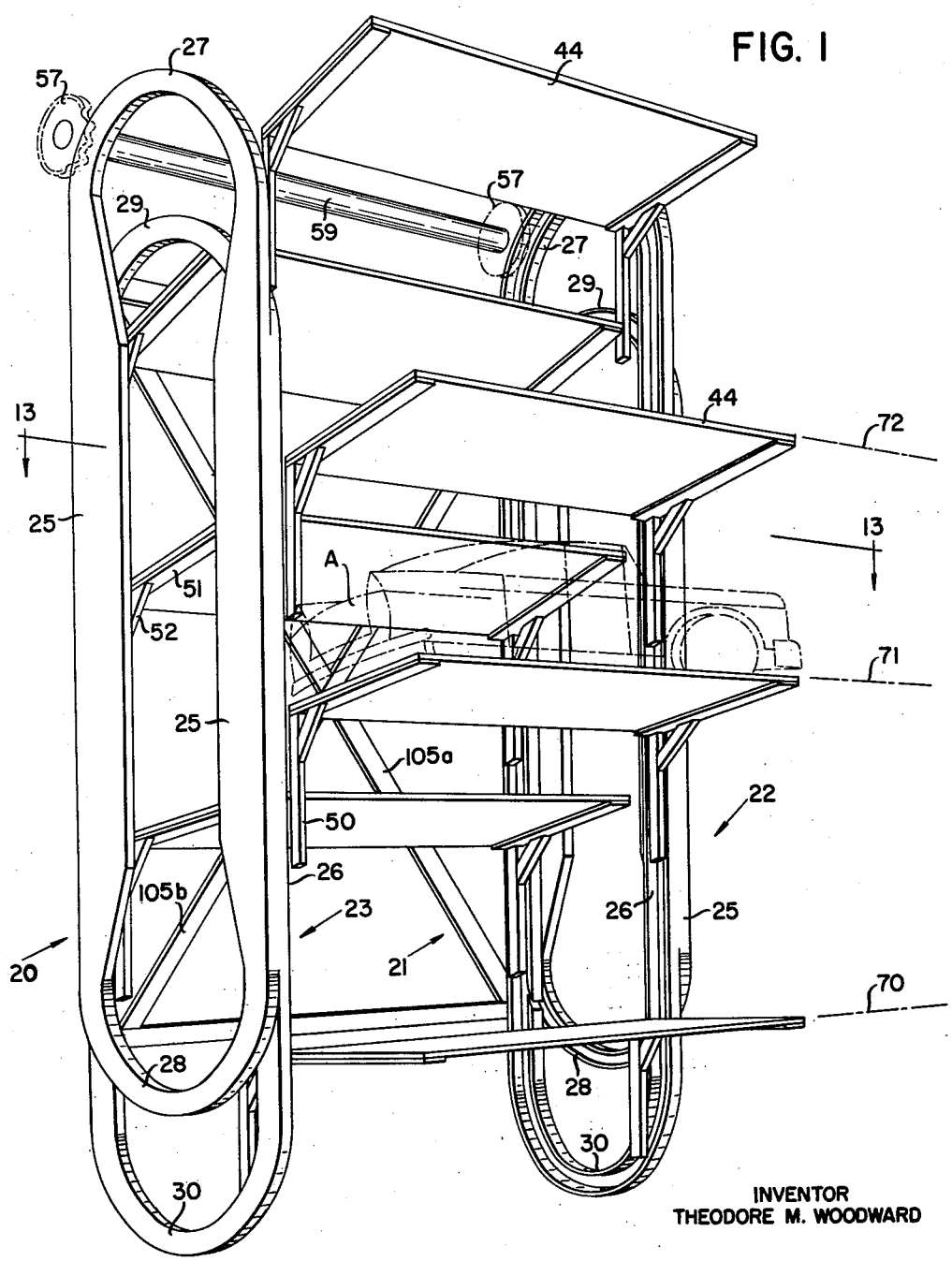
FIGURE 1 is a diagrammatic view in perspective of the conveying structure.

A conveying system for automobiles A and the like, according to this invention, is diagrammatically indicated in perspective in FIGURE 1, in vertical cross-section in FIGURE 2, and in horizontal cross-section in FIGURE 13.

In general, the system may include a plurality of corner channel or groove sections 20, 21, 22 and 23. These channel or groove sections may include a chain or belt channel or groove 25 and a brace channel or groove 26. As each of the corners of the conveying system are somewhat similar or symmetrical with respect to each other, and are continuations of the same general structure, the various similar parts of these corner sections are generally referred to by the same reference numerals.

The vertical chain or belt channels 25 are joined at the top by bridging members or arches 27 and at the bottom by bridging member inverted arches 28. Both the brace channels 26 are joined at the top by bridging member arches 29 and at the bottom by inverted arches 30.

The chain or belt channel 25 carries or guides an orbital conveyor belt or chain made of rollers 31 and 32 which are joined together by outer, or more spread-apart, links 33 and inner, or less spread-apart, links 34. These links 33 and 34 receive the pins 35, 36 and shelf-carrying pins or tubes 37. These pins 35, 36 and 37 receive the links 33 and 34 in any well known manner as to be rotationally free a sufficient amount on the pins 35, 36 and 37, and yet be locked against any outward or inward movement, so that the rollers 31 and 32 are free to rotate. If desired, spacing disks 38 and 39 may be riveted on the links 34, on the outer side in such a manner that they abut against the edges of the links 33 to prevent the chain from folding upon itself beyond a predetermined degree, as indicated in FIGURE 9. These stopping members or discs 38 and/or 39 may be used to prevent the chain from folding upon itself beyond a predetermined degree and exerting excessive spreading action on walls 41 and 63 of chain channel 25 in zone B, FIGURES 2, 3, and 7.

The chain may be constructed according to any suitable method of chain construction which provides the pulleys or rollers 31 and 32 and the pins.

The belt or chain channels or grooves 25 gradually increase or decrease in width from the single width dimension of the arches 27 and 28 to the much wider chain channel shown in the central section such as at the cross-section line 3—3 of FIGURE 2, and as shown in FIGURE 3. This causes the chain to travel in narrow, single file fashion around the arches 27 and 28 and causes the chain to assume a zigzag disposition in the central part, as shown in FIGURES 2 and 9. Slanting boundary channel walls 40 join the inner central channel walls 41 with the inner arch walls 42 to cause the chain gradually to change from the single file construction at the arches 27 and 28 to the zigzag construction of the central parts 25 and vice versa. As will be more fully explained, such construction causes the pins 35, 36 and 37 of the chain to travel at greater speed as they pass through the arches 27 and 28 as compared to their slower speed of travel along the wider channels 25 in zigzag fashion in the central part of the construction.

At suitable intervals, the chain is provided with shelf or platform supporting pins or tubes 37 which are adapted to support the shelves 44 by any suitable construction, such as by passing through holes near the edges of the shelves 44 or by various constructions such as shown at 45 which may encircle the pins 37 and are attached to the underside of the shelves 44.

Each of the shelves 44 may support an automobile A.

The pins 37 may extend only partly along the shelves 44, or the pins 37 may be a single pin construction which extends from one set of rollers 31 to the other set of rollers 31 on the other side of the conveyor construction, as shown in dotted lines in FIGURE 13. That is, the corresponding pins 37 at each side of a shelf may be separate pins, or they may be a single pin which extends from one channel construction such as 20 to the other channel construction 21 at the opposite side. The pins may rotate relatively to the shelves or may be fixed against rotating in the shelves, as desired.

The shelves 44 may be provided with vertical braces 50, which braces are attached to the underside of the shelves 44 at the edge reinforcing members 51 to which a diagonal brace 52 may be secured at one end. The diagonal brace 52 may be secured to the vertical brace 50 at the other end.

The lower ends of the vertical braces 50 may be provided with pins 53, FIGURE 4, which may extend from the brace 50 at the lower end to the roller or guide 54. The pin 53 forms the axle or axis of the roller 54.

The shelves 44 exert part of their lateral force on the pins 37 and belt channel 25 and another part of their lateral force on the pins 53 and brace channel 26. This reduces the strain on the channel walls.

The construction is such that the shelves 44 are supported by the chain so they are always held in horizontal position and travel orbitally at a relatively slow speed in that part of the conveyor construction which was relatively wide chain channels 25 in the central zone B, FIGURE 2, of the construction, whereas the shelves 44 travel at a relatively high speed while passing through zones E and F of the arches 27 and 28. The shelves travel at a changing speed along the upper and lower zones C and D respectively. The purpose of this is to cause the shelf 44 which is passing along the arch 27 or 28, in zones E and F respectively, to travel at high speed and avoid too close an approach by the oncoming shelf 44 and to prevent the damage to the roof of car which is rising or being lowered on the next shelf or platform 44 of the conveyor. This permits a relatively large number of shelves to be provided as compared to the relatively small number of shelves which could be provided in the same height of conveyor if this differential movement of the shelves were not present. The shelves 44 may be relatively close vertically along the vertical zone B, and yet there is no damage to the cars along the arches 27 and 28.

The chains may be driven in unison by a pair of toothed gears 57 which have teeth 58 spaced a correct distance to enter between the wheels or rollers 31 and 32. The gears 57 may be joined by a drive shaft 59, so that the chains on the opposite sides of the conveyor structure are advanced in unison at all times. The shaft 59 may be driven by any prime mover.

The size of the links, rollers, etc., and the number thereof is so chosen that the shelves 44 are properly spaced from each other when they are in vertical relationship with respect to each other along the zone B in a such a manner that they receive automobiles of the desired height without damage as the shelves travel throughout the path or orbit of the chain travel.

Any type of construction may be used to provide the wide chain track construction 25 at the central part or zone B of the conveyor construction and the narrow, single file type of channels at the arches 27 and 28, and the intermediate tapering width channels formed by the slanting walls 40 in the zones C and D between the central part B and the arch parts 28 and 29 in zones E and F of the construction. Also, any type of construction may be used to provide the bracing channel 26 inward from the chain channels 25 in such a manner as to receive the bracing rollers 54. Also, any suitable type of construction may be provided whereby the chain will travel in single file along the arches 27 and 28 and in a zigzag manner in the central part or zone B. Also, any type of construction may be provided whereby the bracing rollers 54 may follow the bracing channel 26 along the central part of the conveying structure and along the channels provided in the arches 29 and 30 at the end constructions. Also, any type of construction may be used whereby the shelf supporting pins 37 of the chain construction may cross and pass the inner or outer wall of the channels 26. Such constructions will now be described.

FIGURE 3 is an enlarged upward view of the central part of the channel construction 22 shown in FIGURE 2, taken along line 3—3 of FIGURE 2. Any suitable type of outer wall or frame 60 may support or be secured to the channel wall 61. The channel wall or bottom 61 may be provided with a guiding groove 62 which receives and guides the long ends 36a of the pins 36 of FIGURE 8. The groove 62 is shown in FIGURE 7 and slants inward at 62a, FIGURE 7, to merge with a central channel 62b in the inverted arch 28 of FIGURE 2. A similar construction is provided where the upper part of the wide central chain channel in zone B merges into the narrow channel arch 27 at the top. In this manner the long ends 36a of the pins 36 cooperating with the offset walls of the grooves 62, 62a and 62b causes the rollers 32 to be forced along the inner wall 41 at the vertical run zone B to produce the zigzag construction, and gradually to converge along wall 40 and finally to align themselves with rollers 31 along the arches 27 and 28.

Means are provided to maintain the rollers 31 against or adjacent the outer wall 63 of the chain channel construction. To this end, the wall 63 extends along the outer side of the chain channel and the brace channel. A supporting block 64, FIGURE 3, is secured by any suitable means (as by welding) to the bottom wall 61 and in turn supports a plate 65 which extends over the channel 25 to a point where its edge 66 is adjacent to the long ends 35a of the pins 35 and also along the pin 37 which supports the shelf structure. The offset wall or edge 66 of the plate 65 holds the pin end 35a in proper position. An L-shaped member 67 is secured to the plate 65 by welding or the like and produces the inner wall of the brace channel 26 in which the rollers 54 travel, and which maintain the braces 50 in vertical position and the shelves 44 in horizontal position. The rollers 54 may be locked in the channel 26 by another L-shaped member 55a which holds the rollers 54 from sidewise movement out of the channel 26.

The inner wall 41 of the channel 25 may be separate from or integral with the block 64. The wall 41 slants as previously described along 50 (on a 10° angle for example) to merge with the inner wall 42 of the arches 27 or 28 to maintain the chain in "single file." A similar construction is provided at the other corner channel constructions 21, 23 and 20.

Means are provided to permit the shelf supporting pins 37 to pass the side walls of the brace channel 27 where necessary. To this end, the L-shaped member 67, which forms the inner wall of the brace channel 26, is discontinued, or slotted at the point 67a, FIGURE 2, to permit the shelf support pins 37 to pass into the inverted channel 28 while permitting the rollers 54 to be guided into inverted arch 30.

A similar construction is provided at 67b to permit the pins 37 to pass the inner wall of channel 26 while passing from the channel 28 into the channel 25.

An analogous construction is provided at the upper end of the straight runs of channels 25 and 26 to permit the shelf supporting pins 37 to pass the outer side walls of channel 26 while passing the lower ends of arch 29. The arch 29 has an outer wall 63a, FIGURE 2, which merges at 63b with the vertical walls 63 of the straight run part of the conveyor. The wall 63a has slots at 63c and 63d to permit the pins 37 to pass upward or downward past side wall 63a. That is, similar slots 63c and 63d are provided at both sides of FIGURE 2 near the merging point 63b between the curved wall 63a of arch 29 and the straight vertical walls 63. These slots 63c and 63d permit the shelf supporting pins 37 to pass the outer wall 63a of the arch shaped channel 29 at the merging points 63b.

The slot constructions 63c and 63d, as well as the slot constructions 67a and 67b are sufficiently narrow to prevent derailment of the rollers 54 of the brace construction which are required to travel through the arches 29 and 30 properly to brace the shelf construction.

The shelves 44 move mainly between the vertical central portions or upward and downward vertical paths of the orbit while the shelves are traveling along the left vertical central portion or path in zone C, B, D, as shown in FIGURE 2, and such shelves move mainly outside said vertical central portions or paths while the shelves 44 are traveling along the right vertical central portion or path in zone C, B, D, as shown in FIGURE 2. In this manner the conveyor uses only ⅔ of the ground area which would be necessary if the shelves moved always outside the supporting belt constructions or vertical central portions.

FIGURE 15 shows a construction whereby each shelf 44 may be caused to drain along a respective hollow support pin or pipe 37h through the respective corresponding roller 31h and to discharge at the respective opening 37j. To this end, the shelf 44 is slanted to the drain opening 44. The drain opening 44h may discharge by elbow 44g into the hollow pin or pipe 37h and thus cause all the melting snow or dripping rain to flow outwardly along the channels 25 to suitable openings, not shown, which may be provided at the bottom of the arches 28. This prevents an automobile on one shelf 44 from being soiled by drippings from upper shelves or automobiles. The hollow pipe 37h may replace a regular pin 37 heretofore described.

Dotted lines 70, 71 and 72 of FIGURE 1 show diagrammatically how the conveyor structure may be placed at different levels above and below the ground levels indicated by lines 70, 71 and 72 so that the conveyor may cooperate with any of such ground levels 70. 71 or 72. This indicates that the general conveyor structure shown in FIGURE 1 may be supported at any point with respect to any desired ground level and that the loading may take place at any such level or levels. The words "ground level" are used to describe any loading level above or below normal ground surface.

FIGURE 10 shows an installation in which the conveyor structure or unit b, which may be the same as shown in FIGURE 1, may cooperate with the driveway 73, 74, at "ground level," so that the automobile 75 may approach by the driveway 73, may be loaded onto the shelf 44 and may be raised or lowered from said ground level so other automobiles, such as 76, may be loaded or unloaded at driveway 73, 74, as desired. When it is desired to unload the automobile, the same may be driven off along the driveway 74 to any exit. Any number of units b and drives 73, 74 may be used in parallel or other relationship.

FIGURE 11 shows an installation in which the conveyor unit of FIGURE 1 may cooperate with a driveway 77, 78 so that an automobile 79 may be driven along the drive 75 into the central part of the conveyor structure as indicated at 80 at ground level and may be loaded onto any one of the centrally located platforms 44. The car may then be moved up or down to permit another car to be loaded or unloaded. When the car or other car is to be unloaded, the same may be brought to ground level position and the car then may be driven away along the driveway 78. Any number of units and drives shown in FIGURES 10 and 11 may be used in parallel or other relationship, as desired.

FIGURE 12 shows a construction in which the chains heretofore described, and diagrammatically indicated by the single line 82, in FIGURE 12, may be used to support hanging platforms 83 which may be supported by rods or chains or the like 84, from the pins 37 of the character heretofore described. Under such conditions, the braces 50, 51 and 52 may be omitted, since the platforms 80 tend to remain in hanging position throughout the travel. However, if desired, the bottoms 85 of the platforms 83 may be provided with roller constructions 85 of similar character to rollers 54 described in connection with the other embodiment, and such roller constructions 85 may ride in channels corresponding to 26, 29 and 30 of the character heretofore described and this will tend to maintain the platforms 80 in absolutely horizontal position. Automobiles 86, and other automobiles, may be loaded on or unloaded from the platforms 83 in a manner similar to that indicated in FIGURE 11.

If desired, means may be provided so the sides near the ends 101 of the platforms 44 may be supported while their supporting rollers 32 are approaching, passing, and leaving the top 90 of the arch 27 and the bottom 91 of the inverted arch 28. Such means are illustrated diagrammatically in FIGURES 2, 13 and 17. FIGURE 1 omits this feature.

To this end, two supporting arches 92 and 93 are provided adjacent to the paths of movement of the sides 94 and 95 of the platforms 44. These arches have their edges 96 and 97 as close as possible to the paths of the sides 94 and 95 of the platforms 44. Two similar, but inverted, end supporting, arches 98 are provided adjacent the lower part of the conveyor system as shown in FIGURE 17. These arches support the sides near the ends 101 of the platforms 44 while the supporting rollers 32 of the platforms 44 are adjacent the top 90 and bottom 91 of the arches 27 and 28 respectively.

Supporting wheels 99 are rotationally secured respectively to the sides 94 and 95 near the ends 101 of the platforms 44. These wheels 99 are sufficiently wide to ride on the upper surfaces of the arches 92 and 93, but are sufficiently narrow to pass inside the inner edges of the corner channel sections 22 and 23, as shown in FIGURE 13.

The top surfaces 100 of the four arches 92, 93 and 98 are mainly arch shaped and of the same radius as the lower groove flanges of the channels 27 and 28.

The arches 92, 93 and 98 are placed at proper elevations to support the normally cantilevered ends 101 of the shelves 44 while their main supporting rollers 32 are approaching, passing and leaving the critical strain zone near the horizontal tangents of top 90 of arch 27 and of the bottom 91 of the inverted arch 28. In this manner the normal centilever load which is normally placed on the vertical braces 50 is relieved or eliminated while the platforms 44 are passing these critical strain zones.

If desired the top surfaces 100 of the four arches 92, 93 and 98 may be made of a slightly shorter radius near their ends 102 so the wheels 99 engage and leave the top surfaces 100 in a glancing manner.

The upper supporting arches 92 and 93 may be carried by any suitable construction. For example, it may be supported in cantilever fashion from the corner channel sections 22 and 23 by slanting supporting members 103 and 104. The lower inverted arches 98 may be supported by any suitable foundation construction which will be apparent to those skilled in construction work.

The outer ends of the arches 92, 93 and 98 may be held in proper spaced condition by extension spacing members 105 which are secured to the outer ends of the arches 92, 93 and 98 and extend to a point beyond the outermost travel of the ends 101 of the platforms 44. The outer ends of these spacing members 105 are tied together at proper spacing distance by tying members 106

The orbital belt or chain construction and/or the conveyor system herein disclosed may be used for other purposes and in other positions. For example the belt and/or system may be used mainly in horizontal position, as shown in FIGURE 16.

FIGURE 16 is a diagrammatic representation of a conveyor which may be used as an assembly line in which the belt travels in one position at a peripheral speed different from another portion of the belt, and causes articles or persons to travel at corresponding speeds. The belt or chain may travel at high speed along the narrowest parts or portions 110 and at low speeds in the wider portions 111, 112 and 113. If desired one or more portions may be made of a different width, such as at 114 which has an intermediate width and speed.

The showing in FIGURE 16 is emblematic of the width of the channels shown in the previous embodiments. In general, a link chain may travel in single file along portions 110, in narrow zigzag condition along portion 114 and in wider zigzag condition along portions 111, 112 and 113, to produce the various speeds above indicated.

The relative width of the zigzag condition of the chain or the acuteness of the angle between the links compared to the single file condition in all of the embodiments determines the relative slowness of the chain joints or pins 35, 36 and 37 while the chain is in zigzag condition as in FIGURE 9, and at 111—114 of FIGURE 16 as compared to the highest speed of the joints while the chain is in single file condition, such as along the channels 27 and 28, of FIGURE 2 etc., or along 110 of FIGURE 16. The relative speed is such that the wider the zigzag, as compared to the single file condition, the slower is the speed of the joints in such wider zigzag, compared to the highest speed at single file condition. This feature may be used to produce two or more relative speeds of the joints of the chain or belt and thus to produce two or more relative speeds in any type of conveyor, moving platform, etc. Objects may be transported on platforms or may hang from supporting members, pins, etc. of the conveyor or chain, as desired.

In the operation of a conveyor according to this invention, one, a pair, or more conveyor orbital belts or chains, such as the chains in FIGURES 1, 2 etc., travel in side by side relationship in the grooves or channels 25. The joints at pins 35, 36 and 37 of such chains or belts travel at a relatively slow peripheral speed along the wide zigzag zone B, of FIGURE 2, at gradually increasing or decreasing peripheral speed along the zones C and D, and at high peripheral speed along zones E and F. The width of the zigzag zones may be increased or decreased as desired to obtain different relative speeds, as 114 in FIGURE 16.

The shelves or platforms 44 are caused to be moved at a selected portion of the orbit, such as in zone B, at a different or slower peripheral speed from another or faster peripheral speed at another portion, such as in zone E or F.

The pair of belts or chains are in side by side relationship, as shown in FIGURE 13, with central vertical portions in zone B joined at the top and bottom ends by end bridging portions 27 and 28 at zones E and F in a manner to cause the joints of such belts or chains to travel at different speeds (slower) while traveling along such vertical portions from the speeds (faster) along the bridging portions 27 and 28.

The endless orbital belts or chains are made of a plurality of links joined end to end by the pins 35, 36 and 37, and means or channels are provided to cause the chain to travel in an orbit with the links in single file along the selected portions or arches 27 and 28 and to travel in zigzag relationship at another portion or portions of the orbit along the vertical wide channels in zone B.

The channel constructions in the arches 27 and 28 are guide means of relatively narrow width for the links of the chains, and the channel constructions along the zone B is of relatively wide width.

The shelves 44 may be used as conveyors for parked cars in which cars are driven along driveways 73 or 77 and are parked on a shelf 44 which is previously positioned at the level of such driveway. Thereafter, if desired, such shelf 44 may be moved up or down so another car may be parked on a shelf 44 which is newly positioned at the driveway level.

When it is desired to unpark the car, the shelf 44 which is supporting such car is moved up or down, if necessary, to the level of the driveway 74 or 78 and is stopped at such level. The car is then driven off such shelf 44.

The relatively slow speed of the shelves 44 along zone B of FIGURE 2 permits the shelves 44 to be placed at relatively close vertical spacing. When these shelves pass to the high speed zones, or arches 27 and 28 such shelves 44 move at high speed and move out of the way of the next approaching shelf to prevent damage to the car on such shelf. This slow and high speed differential permits the use of a conveyor which is of much less height than a conveyor with the same number of shelves in which such speed differential is not provided.

The shelves are maintained in substantially horizontal condition by the means or brace members 50 which have rollers 54 traveling in channel 26. If desired, the sides of the shelves, near their outer ends 101 are supported on arches 92, 93 and 98 to aid in maintaining the shelves in the desired substantially horizontal condition.

Suitable cross-bracing members 105a and 105b may be provided properly to space the chain channel members when the shelves 44 do not travel between such channel members. If desired suitable side extensions, not shown, may be secured to the outer parts of the channel members and may extend beyond the travel paths of the shelves. These side extensions may then be tied together by cross-bracing members, not shown, which are sufficiently high above the ground level so they do not interfere with the parking of cars. This construction may be used with the pendant shelf construction.

An economical and superior conveyor construction is thus provided.

While the form of the invention now preferred has been disclosed as required by the statutes, other forms may be used, all coming within the scope of the claims which follow.

What is claimed is:

1. A conveyor for parking cars comprising in combination: a pair of chain channels, each channel being constructed with two relatively wide vertical runs and two relatively narrow end runs and with sections of converging width joining said vertical runs with said end runs to form a continuous chain channel; a pair of chains, each chain having links and pins, each chain traveling in one of said chain channels respectively; with said links and pins caused by said sections of converging width to fold said chain in a zig-zag condition to decrease the speed of said chain as it enters said wide vertical runs and to unfold said chain to increase the speed of said chain as it leaves said wide vertical runs; a plurality of extensions carried by some of said pins between said chains; a plurality of shelves supported respectively by said extensions; a pair of brace channels paralleling said chain channels in offset relationship thereto; pairs of braces attached to each of said shelves respectively, each of said braces having a roller attached thereto for movment respectively within one of said brace channels; and power means to drive said chains around said channels.

2. A device as claimed in claim 1 in which said rollers are continuously maintained in vertical alignment to maintain said shelves in horizontal position.

3. A conveyor comprising in combination: a pair of chain channels, each channel being constructed with two relatively wide vertical runs and two relatively narrow end runs and with sections joining said vertical runs with said end runs to form a continuous chain channel; a pair of chains, each chain traveling in a respective chain channel and said sections causing said chains to fold in a zig-zag condition to travel at a relatively slow speed as said chain enters said wide vertical runs and causing said chain to unfold as said chain leaves said wide vertical runs to cause said chain to travel at a relatively high speed in said narrow end runs; a plurality of shelves, each shelf being supported continuously by both of said chains; a pair of brace channels parallelling said chain channels in offset relationship thereto; pairs of braces attached to each of said shelves respectively, each of said braces having a roller moving within a respective brace channel to maintain said shelf continuously horizontal; and power means to drive said chains around said channels.

4. A conveyor according to claim 3 in which said chains have links in zig-zag condition while traveling in said wide runs.

5. A conveyor according to claim 3 in which each shelf is supported with a major portion of said shelf extending as a cantilever from said chains.

6. A conveyor according to claim 3 in which said chains have links in zig-zag condition while traveling in said wide runs and in single file condition while traveling in said narrow runs.

7. A conveyor according to claim 3 in which said chains have links and pins and in which said shelves are continuously supported on some of said pins.

8. A conveyor according to claim 7 in which said links are in zig-zag condition when traveling in said wide runs.

9. A conveyor according to claim 7 in which said brace channels are of a constant width.

10. A conveyor according to claim 3 in which said chains have pins and links which travel in zig-zag condition in said wide runs and in which said links have limit means to limit the extent of the zig-zag condition.

11. A conveyor according to claim 10 in which said limit means are in the form of discs on said links.

12. A conveyor according to claim 3 in which drain means are provided on said shelves to drain water from said shelves into said chain channels.

References Cited in the file of this patent

UNITED STATES PATENTS

| | | |
|---|---|---|
| 1,270,001 | Boos et al. | June 18, 1918 |
| 1,557,368 | Kershaw et al. | Oct. 13, 1925 |
| 2,078,770 | Morton | Apr. 27, 1937 |